(12) United States Patent
Kim (10) Patent No.: US 12,319,335 B2
(45) Date of Patent: Jun. 3, 2025

(54) STEERING DEVICE OF VEHICLE

(71) Applicant: HL MANDO CORPORATION, Gyeonggi-do (KR)

(72) Inventor: Doohyuk Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/387,757

(22) Filed: Nov. 7, 2023

(65) Prior Publication Data
US 2024/0278822 A1    Aug. 22, 2024

(30) Foreign Application Priority Data

Feb. 22, 2023    (KR) .................. 10-2023-0023483

(51) Int. Cl.
*B62D 1/184*    (2006.01)
*B62D 1/19*    (2006.01)

(52) U.S. Cl.
CPC ............ *B62D 1/184* (2013.01); *B62D 1/195* (2013.01)

(58) Field of Classification Search
CPC ..................................... B62D 1/184
See application file for complete search history.

(56) References Cited

U.S. PATENT DOCUMENTS

| | | | | |
|---|---|---|---|---|
| 5,655,413 A | * | 8/1997 | Barton | B62D 1/184 74/531 |
| 7,455,320 B2 | * | 11/2008 | Imamura | B62D 1/195 280/777 |
| 7,677,132 B2 | * | 3/2010 | Oh | B62D 1/185 280/775 |
| 8,601,901 B2 | * | 12/2013 | Ishii | B62D 1/184 280/775 |
| 11,827,268 B2 | * | 11/2023 | Kim | B62D 1/192 |
| 2005/0160863 A1 | * | 7/2005 | Matsumiya | B62D 1/16 74/492 |

FOREIGN PATENT DOCUMENTS

| | | | | |
|---|---|---|---|---|
| CN | 203558119 U | * | 4/2014 | |
| CN | 108357559 A | * | 8/2018 | ............ B62D 1/184 |
| EP | 1854699 A2 | * | 11/2007 | ............ B62D 1/184 |
| EP | 1854701 B1 | * | 9/2009 | ............ B62D 1/195 |
| JP | 2564999 Y2 | * | 3/1998 | |
| JP | 4609203 B2 | * | 1/2011 | ............ B62D 1/184 |
| JP | 5030029 B2 | * | 9/2012 | |
| JP | 5104886 B2 | * | 12/2012 | ............ B62D 1/184 |
| KR | 102113015 B1 | * | 5/2020 | |
| WO | WO-2012114812 A1 | * | 8/2012 | ............ B21D 53/88 |
| WO | WO-2012132505 A1 | * | 10/2012 | ............ B60R 21/09 |

* cited by examiner

*Primary Examiner* — Nicole T Verley
(74) *Attorney, Agent, or Firm* — WOMBLE BOND DICKINSON (US) LLP

(57) ABSTRACT

A steering device of a vehicle can prevent damage to one or more components of the steering device and loss of shock load absorption function during the telescoping of the steering device while implementing structural rigidity with increase in design freedom.

18 Claims, 7 Drawing Sheets

STEERING DEVICE OF VEHICLE

CROSS-REFERENCE TO RELATED APPLICATION

This application claims priority from Korean Patent Application No. 10-2023-0023483, filed on Feb. 22, 2023, which is hereby incorporated by reference for all purposes as if fully set forth herein.

BACKGROUND

Technical Field

The present disclosure generally relates to a steering device of a vehicle and, more specifically, to a steering device of a vehicle capable of preventing the damage to one or more components of the steering device and the loss of shock load absorption function during the telescoping of the steering device while implementing structural rigidity with increase in design freedom.

Description of Related Art

In general, the steering column of a vehicle has a telescoping feature by which the driver may adjust the position of the steering wheel to fit the height or body shape of the driver, the steering column of the vehicle may include a collapsing feature that can protect the driver by allowing the steering column to contract in order to absorb the shock load when the driver hits the steering wheel during a car crash or accident. However, if excessive force is applied to the steering wheel during the telescoping, a bending plate included in the steering column may be plastically deformed, thereby losing or deteriorating the shock absorbing capability of the collapsing feature.

SUMMARY

Some of embodiments of the present disclosure relate to a steering device of a vehicle capable of preventing the damage to one or more components of the steering device and the loss of shock load absorption function during the telescoping of the steering device while implementing structural rigidity with increase in design freedom.

According to some embodiments of the present disclosure, there may be provided a steering device of a vehicle, comprising a lower tube receiving an upper tube, a locking unit operated to lock or unlock an axial movement of the upper tube with respect to the lower tube by a lever, and a stopper positioned to axially overlap the axial movement of the upper tube in interoperation with the locking unit unlocking the upper tube.

According to certain embodiments of the present disclosure, there may be provided a steering device of a vehicle, comprising an upper tube receiving a steering shaft and including an axial first slit passing through an outer circumferential surface and an inner circumferential surface, a lower tube receiving the upper tube and including an axial second slit passing through an outer circumferential surface and an inner circumferential surface, a pair of distance brackets facing each other with the second slit disposed therebetween, and a first stopper spaced apart from the distance bracket in a direction in which the steering shaft collapses, a bolt passing through the distance bracket and coupled with a lever, a second stopper coupled to the bolt and inserted into the first slit or removed from the first slit according to manipulation of the lever, and a bending plate coupled to the upper tube and including a support positioned between the first stopper and the distance bracket.

According to certain embodiment of the present embodiments, it is possible to prevent the damage to one or more components of the steering device and loss of shock load absorption function during the telescoping of the steering device while implementing structural rigidity with increase in design freedom.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION OF EMBODIMENTS

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
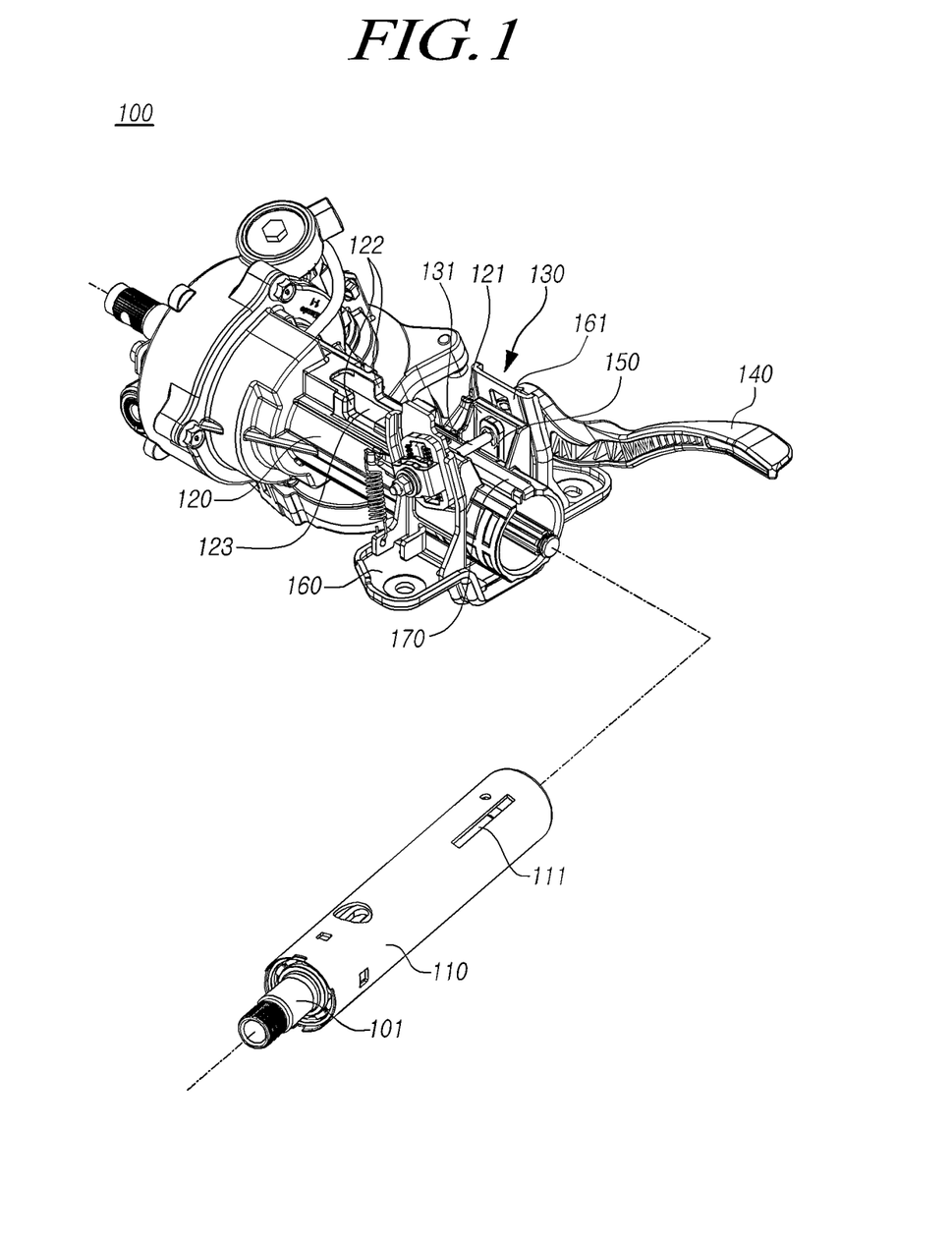
FIG. 1 is an exploded perspective view for illustrating a steering column for a vehicle according to an embodiment of the present disclosure.
Figure 2:
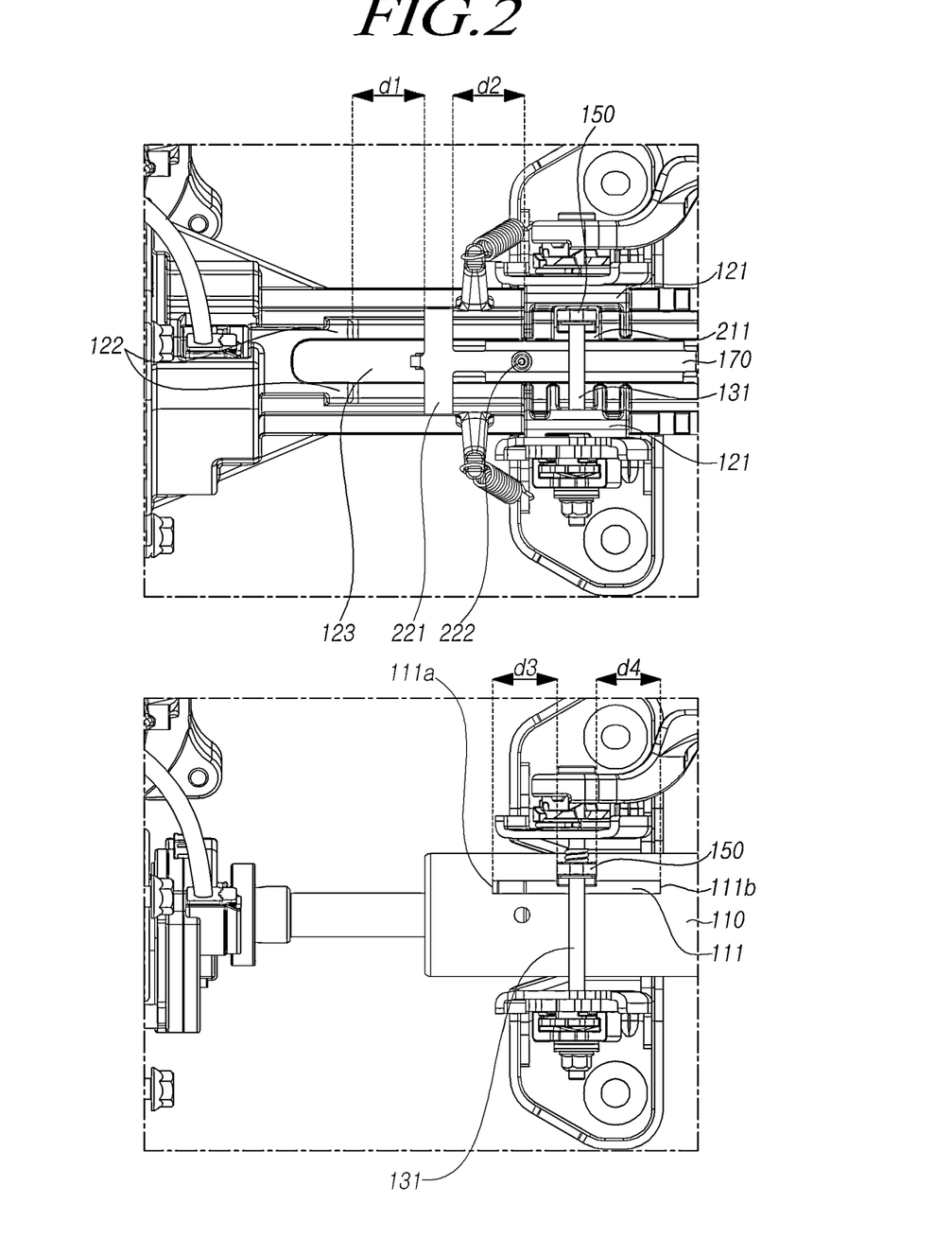
FIG. 2 is views for illustrating operations of a steering device of a vehicle according to an embodiment of the present disclosure.
Figure 3:
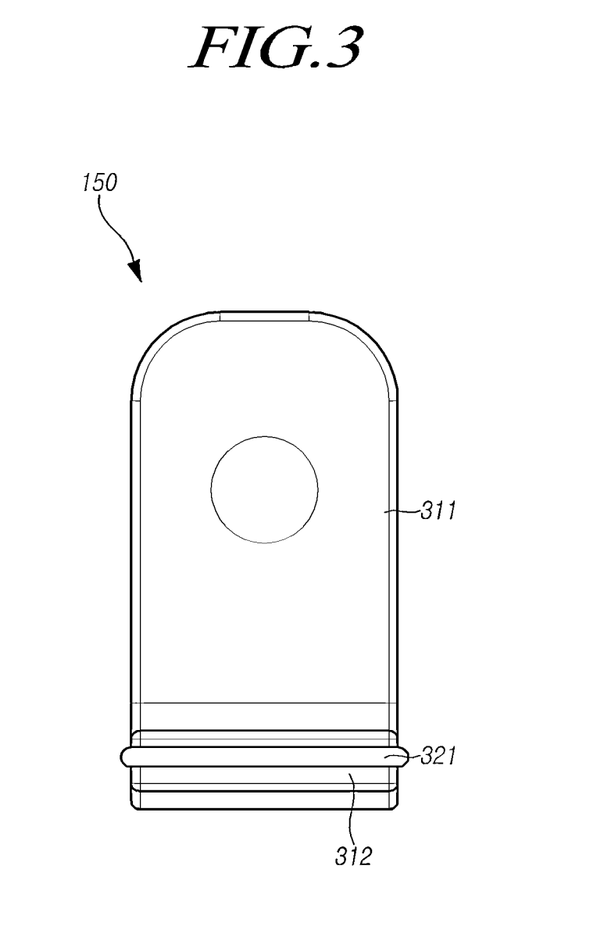
FIG. 3 is a view for illustrating a portion of a steering device of a vehicle according to an embodiment of the present disclosure.
Figure 4:
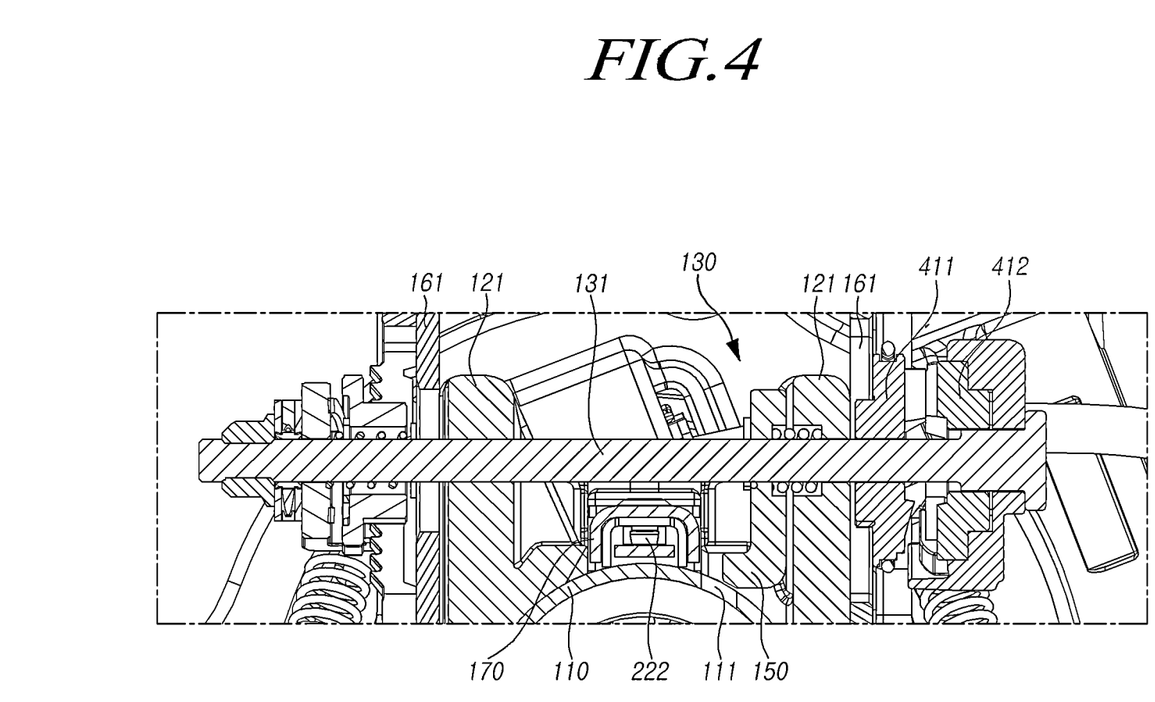
FIG. 4 is a cross-sectional view for illustrating a steering device of a vehicle according to an embodiment of the present disclosure.
Figure 5:
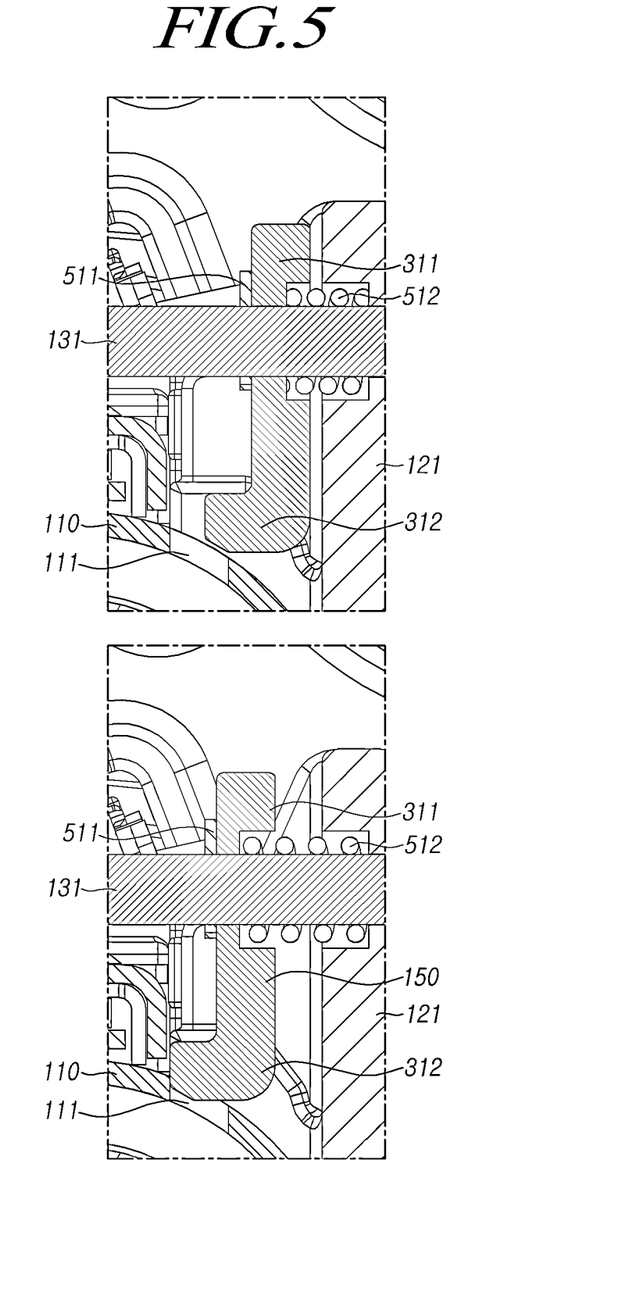
FIG. 5 is cross-sectional views for illustrating a portion of a steering device of a vehicle according to an embodiment of the present disclosure.
Figure 6:
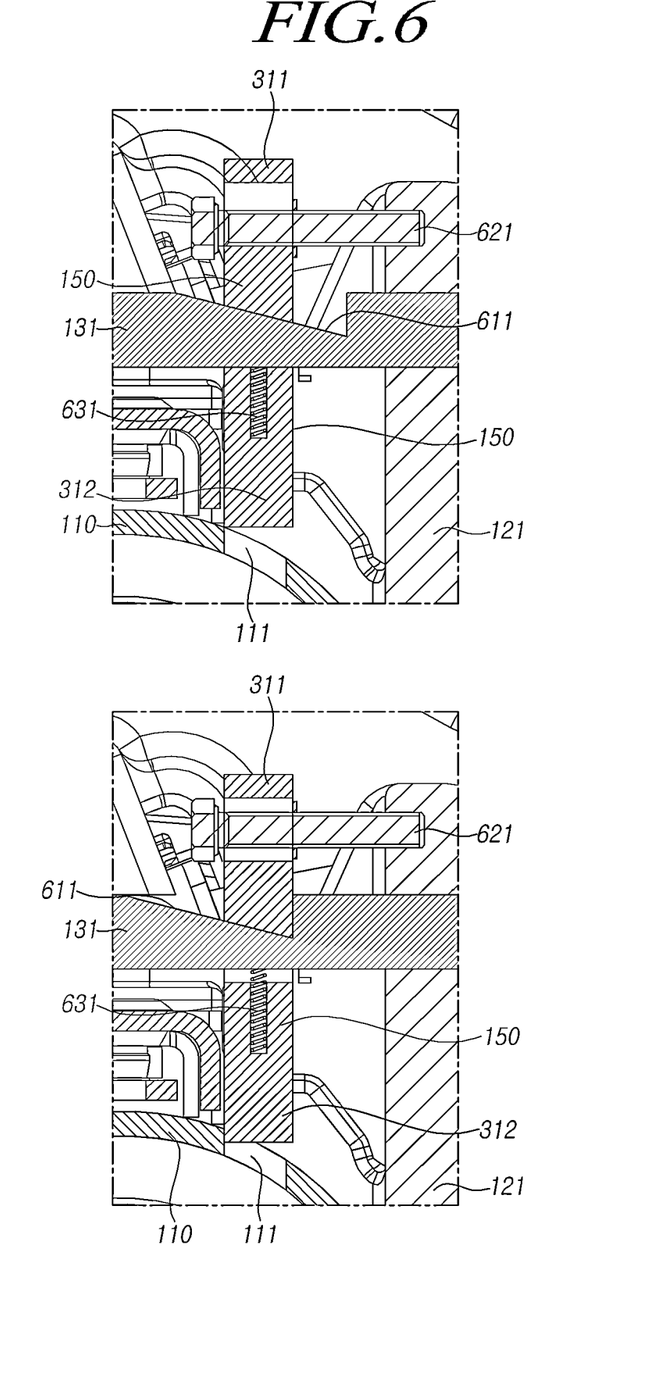
FIG. 6 is cross-sectional views for illustrating a portion of a steering device of a vehicle according to an embodiment of the present disclosure.
Figure 7:
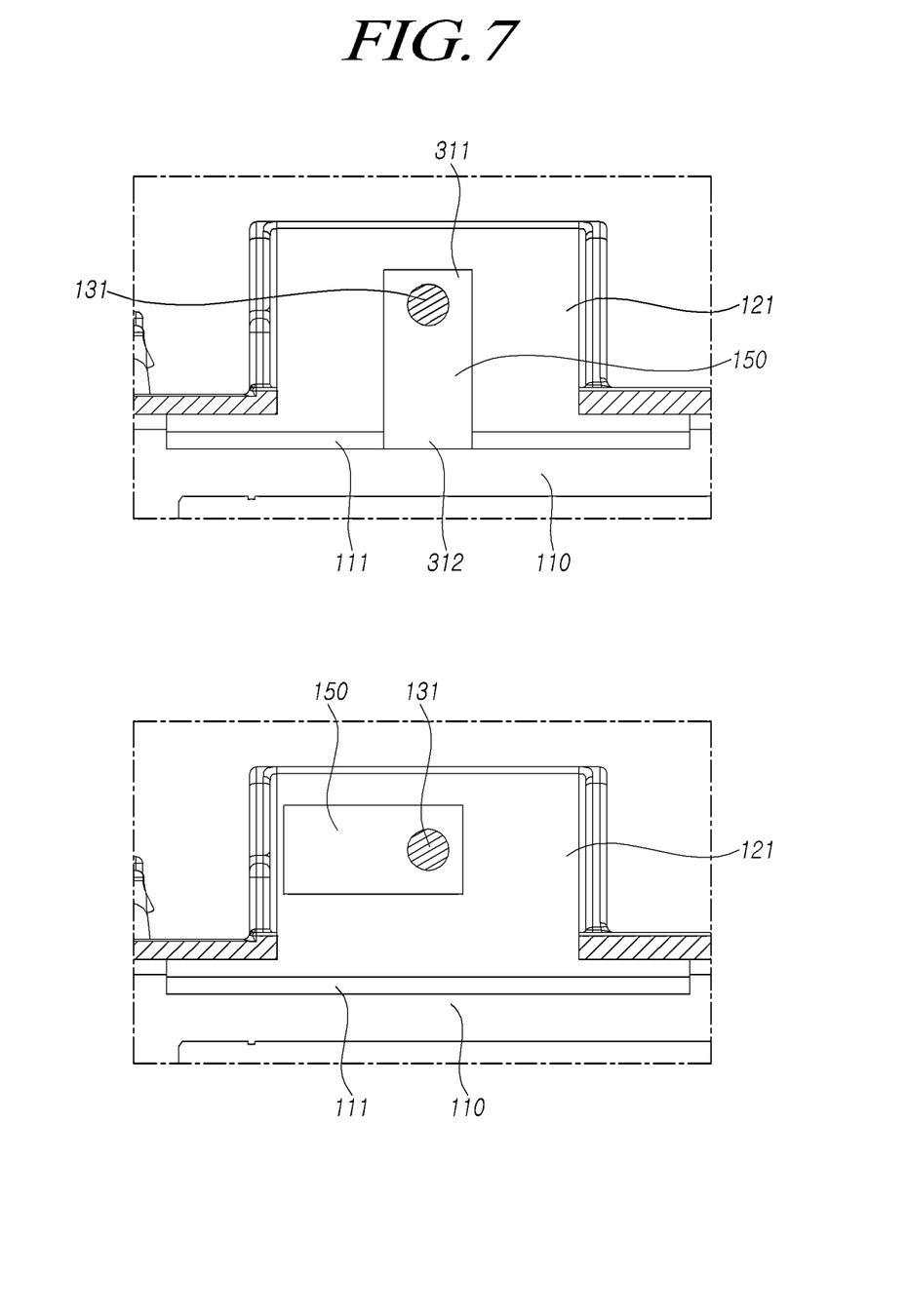
FIG. 7 is cross-sectional views for illustrating a portion of a steering device of a vehicle according to an embodiment of the present disclosure.

FIG. 1 is an exploded perspective view for illustrating a steering column for a vehicle according to an embodiment of the present disclosure. FIG. 2 is views for illustrating operations of a steering device of a vehicle according to an embodiment of the present disclosure. FIG. 3 is a view for illustrating a portion of a steering device of a vehicle according to an embodiment of the present disclosure. FIG. 4 is a cross-sectional view for illustrating a steering device of a vehicle according to an embodiment of the present disclosure. FIG. 5 is cross-sectional views for illustrating a portion of a steering device of a vehicle according to an embodiment of the present disclosure. FIG. 6 is cross-sectional views for illustrating a portion of a steering device of a vehicle according to an embodiment of the present disclosure. FIG. 7 is cross-sectional views for illustrating a portion of a steering device of a vehicle according to an embodiment of the present disclosure.

A steering device 100 of a vehicle according to an embodiment of the present disclosure includes a lower tube 120 receiving an upper tube 110, a locking unit or locker 130 configured to lock or unlock an axial movement of the upper tube 110 with respect to the lower tube 120 by a lever 140, and a stopper 150 positioned to axially overlap the axial movement of the upper tube 110 in interoperation with the locking unit 130 which is in a state of unlocking the upper tube 110.

Referring to FIG. 1, the upper tube 110 receives a steering shaft 101 and is coupled to the lower tube 120. The upper tube 110 may be configured to be axially movable or slidable with respect to the lower tube 120. The locking unit or locker 130 may be configured to lock or unlock the axial movement of the upper tube 110 with respect to the lower tube 120. The driver may adjust the position of the steering wheel by manipulating the lever 140 in the unlocking direction or to the unlocking position and performing telescoping and then fix the position of the steering wheel by manipulating the lever 140 in the locking direction or to the locking position.

The stopper 150 is positioned to axially overlap the axial movement of the upper tube 110 in interoperation with the operation in which the driver manipulates the lever 140 in the unlocking direction or to the unlocking position. In other words, when the driver manipulates the lever 140 in the unlocking direction or to the unlocking position and performs the telescoping of the steering device 100, the upper tube 110 is axially supported by the stopper 150, and the telescopable range of the steering device 100 is limited by the stopper 150.

In other words, the axially telescopable range of the steering device 100 according to an embodiment of the present disclosure can be set by the stopper 150 that is positioned to axially overlap the upper tube 110 when the driver manipulates the lever 140 in the unlocking direction or to the unlocking position. As the stopper 150 is supported on the axial movement of the upper tube 110 to one side or the other side in the axial direction, the telescoping of the steering device 100 is stopped.

The upper tube 110 may have, or is coupled to, a bending plate 170 to absorb the load during the collapsing of the steering column. As the telescoping range of the steering device 100 is limited by the stopper 150, the bending plate 170 may not be supported on the lower tube 120 during the telescoping of the steering device 100. In a conventional steering device, a bending plate is axially supported on the lower tube to limit the telescopable range of the steering device 100 and, during the collapsing of the steering column, even after the bending plate is supported on the lower tube in the telescoping-in direction, the steering column is further contracted, thereby plastically deforming the bending plate to absorb the load. In such a structure of the conventional steering device, if the driver applies an excessive force during the telescoping of the steering column, when the telescoping of the steering column is stopped while the bending plate is supported on the lower tube in the telescoping-in or telescoping-out direction, the bending plate may be partially plastically deformed, thereby deteriorating the shock absorption capability, or damaging the bending plate to lose the collapsing function.

However, in the vehicle steering device 100 according to an embodiment of the present disclosure, as the stopper 150 axially overlaps the axial movement of the upper tube 110 to limit the telescopable range of the steering device 100, no axial force may be applied to the bending plate 170 during the telescoping of the steering device 100. Accordingly, even if the driver performs the telescoping with excessive force, the deterioration of the shock absorption capability or loss of the collapsing function may be avoided.

Further, the bending plate 170 may be coupled to the upper tube 110 via a coupling member 222 that is sheared by the collapsing load. During the collapsing of the steering device 100, the coupling member 222 may be sheared, so that the coupling between the bending plate 170 and the upper tube 110 can be released, and the upper tube 110 can be inserted into the lower tube 120, and the bending plate 170 is plastically deformed while being supported on the lower tube 120. According to an embodiment of the present disclosure, since no axial force is applied to the bending plate 170 during the telescoping of the steering device 100, the coupling member 222 is not damaged by the driver's excessive force, and thus, a component, e.g., the bending plate 170, is prevented from being fallen off or damaged.

According to an embodiment, the upper tube 110 may have an axial slit 111 passing through the outer circumferential surface and inner circumferential surface of the upper tube 110. The slit 111 may be formed in a portion of the upper tube 110 which is inserted into the lower tube 120.

According to an embodiment of the present disclosure, the stopper 150 may be inserted into the slit 111 of the upper tube 110 if the upper tube 110 is unlocked. As the stopper 150 is inserted into the slit 111 of the upper tube 110, the stopper 150 may axially overlap the axial movement of the upper tube 110. Accordingly, during the telescoping of the steering device 100, the stopper 150 can be supported on, or be in contact with, one of two opposite ends of the slit 111, thereby limiting the telescoping range of the steering device 100.

According to an embodiment of the present disclosure, if the upper tube 110 is locked, the stopper 150 may be removed from the slit 111. In other words, the stopper 150 may interwork with the driver's manipulation of the lever 140 to be changed from a state of being removed from the slit 111 to a state of being inserted into the slit 111 if the lever 140 is manipulated in the unlocking direction or to the unlocking position and to be changed from the state of being inserted in the slit 111 to the state of being removed from the slit 111 if the lever 140 is manipulated in the locking direction.

The operation of the steering device 100 of the vehicle according to an embodiment of the present disclosure is described with reference to an embodiment depicted in FIG. 2. The lower tube 120 may have a slit 123 to allow the lower tube 120 to be pressed by the locking unit 130 to lock the upper tube 110. The bending plate 170 may be coupled to the upper tube 110 to be positioned in the slit 123 of the lower tube 120 to be axially movable together. The lower tube 120 has a stopper 122 where the bending plate 170 is supported during the collapsing of the steering device 100. The bending plate 170 may have a support 221 that axially overlaps the stopper 122 of the lower tube 120.

In the vehicle steering device 100 according to an embodiment of the present disclosure, during the telescoping of the steering device 100, the bending plate 170 is not supported on the stopper 150 of the lower tube 120 and the distance bracket 121.

In other words, as the axial distance d3 between the stopper 150 and an end portion 111a of the slit 111 in the collapsing direction (e.g, toward left in FIG. 2) is designed to be shorter than the axial distance d1 between the support 221 of the bending plate 170 and the stopper 122 of the lower tube 120, the stopper 150 is supported on the upper tube 110 before the bending plate 170 is supported on the lower tube 120 during a telescoping-in operation.

Further, as the axial distance d4 between the stopper 150 and the opposite end portion 111b of the slit 111 in the collapsing direction (e.g., toward right in FIG. 2) is designed to be shorter than the axial distance d2 between the support 221 of the bending plate 170 and the distance bracket 121, the stopper 150 is supported on the upper tube 110 before the bending plate 170 is supported on the lower tube 120 during a telescoping-out operation.

Referring to FIG. 3, according to an embodiment of the present disclosure, a damper 321 may be provided at a portion of the stopper 150 which is inserted into the slit 111. Because the stopper 150 has the damper 321, shock absorption may occur when the telescoping of the steering device 100 is stopped while the stopper 150 is supported on one of two opposite ends of the slit 111, thereby enhancing the driver's manipulation while mitigating noise.

Referring to FIGS. 4 and 5, an embodiment of the vehicle steering device 100 according to the present embodiments is described. FIG. 4 illustrates a locking state in which the stopper 150 is removed from the slit 111. FIG. 5 illustrates a state in which the stopper 150 is inserted in the slit 111 and a state in which the stopper 150 is removed from the slit 111.

According to an embodiment of the present disclosure, the locking unit 130 may include a bolt 131 coupled with the lever 140. The bolt 131 may be movable and rotatable in the axial direction of the bolt 131 according to the manipulation of the lever 140, and the stopper 150 may be coupled to the bolt 131. In other words, the stopper 150 may be moved in interoperation with, or in association with, the axial movement and/or rotation of the bolt 131 by the manipulation of the lever 140, and may be positioned to axially overlap the axial movement of the upper tube 110.

According to an embodiment of the disclosure, the structures of the upper tube 110, the lower tube 120, and the locking unit 130 will be described in greater detail. The lower tube 120 may have the axial slit 111 passing through the outer circumferential surface and inner circumferential surface of the lower tube 120, and a pair of distance brackets 121 facing each other with the slit 111 disposed therebetween. The mounting bracket 160 fixed to the body of the vehicle may include a pair of plate brackets 161 supported on the outer surfaces of the distance brackets 121. The plate bracket 161 may have a tilt hole formed in a tilting direction, and the driver may manipulate the lever 140 in the unlocking direction or to the unlocking position to perform tilting. The locking unit 130 may further include a fixed gear and a movable gear for locking and unlocking the tilting of the steering column.

The bolt 131 may be provided to pass through the plate bracket 161 and the distance bracket 121, and the locking unit 130 may further include a fixed cam 411 and a movable cam 412. The fixed cam 411 may be inserted in the tilt hole of the plate bracket 161 to be fixed in the rotational direction. And, the movable cam 412 may be rotatable together with the bolt 131 by the manipulation of the lever 140. For example, if the driver manipulates the lever 140 in the locking direction or to the locking position, the movable cam 412 is spaced apart from the fixed cam 411, and a pressing force is generated to the distance bracket 121, and the axial movement of the upper tube 110 is limited. If the driver manipulates the lever 140 in the unlocking direction or the unlocking position, the movable cam 412 may approach the fixed cam 411, and the pressing force to the distance bracket 121 is released, and the telescoping of the steering device 100 may be performed. When the bolt 131 is rotated by the manipulation of the lever 140, the bolt 131 is axially moved by the fixed cam 411 and the movable cam 412.

According to an embodiment of the present disclosure, if the upper tube 110 is unlocked, the stopper 150 may be moved in the axial direction of the bolt 131 to be inserted into the slit 111. In other words, referring to FIG. 5, the stopper 150 may be moved horizontally to be inserted into the slit 111.

The stopper 150 may have a coupling hole to which the bolt 131 is inserted, be coupled with the bolt 131, and be axially fixed to the bolt 131. Therefore, when the bolt 131 is moved in the axial direction of the bolt 131 by the manipulation of the lever 140, the stopper 150 may be moved along with the bolt 131 to be inserted into or removed from the slit 111.

According to an embodiment of the present disclosure, the steering device 100 of the vehicle may further include a fixing member or fixer 511 coupled to the bolt 131 and supported by the stopper 150, and an elastic member 512 elastically pressing the stopper 150 such that the stopper 150 can be in tight contact with the fixing member 511. The fixing member 511 may be, for example, but not limited to, a snap ring, and the elastic member 512 may be, for example, but not limited to, a coil spring. The fixing member 511 may be coupled to the outer circumferential surface of the bolt 131 and supported on one side surface of the stopper 150, and the elastic member 512 may apply elastic force to the stopper 150 in a direction toward the fixing member 511 such that the stopper 150 can be in tight contact with the fixing member 511. The stopper 150 may be axially fixed to the bolt 131 by the fixing member 511 and the elastic member 512. One side of the elastic member 512 is supported by the distance bracket 121 and another side of the elastic member 512 may press the stopper 150.

Referring to FIG. 6, according to an embodiment of the present disclosure, if the upper tube 110 is unlocked, the stopper 150 may be moved in the radial direction of the bolt 131 to be inserted into the slit 111 of the upper tube 110. In to the embodiment illustrated in FIG. 6, the stopper 150 may be movable vertically to be inserted into the slit 111 of the upper tube 110.

The stopper 150 may be fixed, or cannot move, in the axial direction of the bolt 131, and, when the bolt 131 is axially moved by the manipulation of the lever 140, the stopper 150 may be moved in the radial direction of the bolt 131 to be inserted into or removed from the slit 111 of the upper tube 110.

The embodiment shown in FIG. 6 may include an inclined recess 611 where the stopper 150 is seated or slidably coupled may be formed on the bolt 131, and an elastic member 631 configured to elastically support the stopper 150 in a direction in which the stopper 150 can be inserted into the slit 111. The inclined recess 611 may be recessed from the outer circumferential surface of the bolt 131, and the stopper 150 is seated on the inclined recess 611 of the bolt 131. The stopper 150 is not moved and is fixed in the axial direction of the bolt 131, so that when the bolt 131 is axially moved, the stopper 150 is moved in the radial direction of the bolt 131 in association with the inclination of the inclined recess 611. To prevent or limit the movement of the stopper 150 in the axial direction of the bolt 131, a coupling member 621 coupled to the distance bracket 121 and passing through the stopper 150 may be provided. The stopper 150 may have a coupling hole which is elongated in the radial direction of the bolt 131 and in which the coupling member 621 is inserted, so that the stopper 150 cannot move in the axial direction of the bolt 131 while being movable in the radial direction of the bolt 131.

The elastic member 631 may be, for example, but not limited to, a coil spring, and may elastically support or press the stopper 150 in a direction of being inserted into the slit 111 (e.g., a direction toward lower side in FIG. 6) to allow the stopper 150 to be smoothly inserted into the slit 111. As shown in FIG. 6, the stopper 150 may have a hole into which the elastic member 631 is inserted, and the elastic member 631 may provide elastic force while being supported on the bolt 131 in the state of being inserted in the hole of the stopper 150.

Referring to FIG. 7, according to an embodiment of the present disclosure, if the upper tube 110 is unlocked, the stopper 150 may be rotated together with the bolt 131 so that a portion of the stopper 150 can be inserted into the slit 111 of the upper tube 110. The stopper 150 may be fixed to the bolt 131 in the rotational direction of the bolt 131 so that when the bolt 131 is rotated by the manipulation of the lever 140, the stopper 150 may be rotated together with the bolt 131 to be inserted into or removed from the slit 111 of the upper tube 110. The stopper 150 may be not moved and may be fixed in the axial direction of the bolt 131, or may be fixed to the bolt 131 in the axial direction of the bolt 131 to be rotated together with the bolt 131.

According to the embodiment illustrated in FIG. 7, the bolt 131 and the stopper 150 may be coupled via, for example, but not limited to, a spline. The stopper 150 may have a coupling hole in which the bolt 131 is inserted, the bolt 131 may be inserted and coupled to the coupling hole of the stopper 150, and splines may be formed on the coupling hole of the stopper 150 and at least a portion of the bolt 131 which is inserted into the coupling hole of the stopper 150. The bolt 131 and the stopper 150 are fixed to each other in the rotational direction by the spline.

A steering device 100 according to embodiments of the present disclosure is described below with reference to FIGS. 1 to 5. The steering device 100 of the vehicle according to embodiments of the present disclosure includes an upper tube 110 receiving a steering shaft 101 and including an axial first slit 111 passing through an outer circumferential surface and an inner circumferential surface of the upper tube 110, a lower tube 120 receiving the upper tube 110 and including an axial second slit 123 passing through an outer circumferential surface and an inner circumferential surface of the lower tube 120, a pair of distance brackets 121 facing each other with the second slit 123 disposed therebetween, and a first stopper 122 spaced apart from the distance bracket 121 in a direction in which the steering shaft 101 collapses, a bolt 131 passing through the distance bracket 121 and coupled with a lever 140, a second stopper 150 coupled to the bolt 131 and configured to be inserted into the first slit 111 of the upper tube 110 or removed from the first slit 111 of the upper tube 110 according to the movement or manipulation of the lever 140, and a bending plate 170 coupled to the upper tube 110 and including a support 221 positioned between the first stopper 122 and the distance bracket 121.

According to an embodiment of the present disclosure, the axial distance d3 between an end portion 111a of the first slit 111 of the upper tube 110 and the second stopper 150 in the collapsing direction in the state that the second stopper 150 is inserted in the first slit 111 may be shorter than the axial distance d1 between the first stopper 122 and the support 221. Accordingly, when the driver performs the telescoping of the steering device 100, the bending plate 170 is not supported on the lower tube 120 in the telescoping-in direction. Therefore, it is possible to prevent the loss of the shock absorption function or performance deterioration.

According to an embodiment of the present disclosure, the axial distance d4 between the opposite end portion 111a of the first slit 111 of the upper tube 110 and the second stopper 150 in the collapsing direction in the state that the second stopper 150 is inserted in the first slit 111 may be shorter than the axial distance d2 between the distance bracket 121 and the support 221. Accordingly, when the driver performs the telescoping of the steering device 100, the bending plate 170 is not supported on the lower tube 120 in the telescoping-out direction. Therefore, it is possible to prevent the loss of the shock absorption function or performance deterioration.

According to an embodiment of the present disclosure, the bending plate 170 may be coupled to the upper tube 110 via a coupling member 222 that is sheared by the collapsing load. It is possible to prevent damage to the coupling member 222 by preventing an axial force from being applied to the bending plate 170 during the telescoping of the steering device 100. Therefore, it is possible to prevent the loss of the shock absorption function or performance deterioration.

According to an embodiment of the present disclosure, a movable cam 412 configured to be rotatable by the lever 140 and a fixed cam 411 engaged with the movable cam 412 may be included in the steering device 100. The movable cam 412 and the fixed cam 411 are positioned at one end portion of the bolt 131, the movable cam 412 is coupled with the lever 140 and rotated by the movement or manipulation of the lever 140, and the fixed cam 411 is fixed and coupled to the plate bracket 161. During the manipulation of the lever 140, the bolt 131 may be axially moved by the movable cam 412 and the fixed cam 411 to press the lower tube 120 to lock or unlock the telescoping of the steering device 100.

According to an embodiment of the present disclosure, the lower tube 120 has a cutout 211 passing through the outer circumferential surface and the inner circumferential surface of the lower tube 120 between the distance brackets 121. The first slit 111 is formed at the position corresponding to the cutout 211. The second stopper 150 may include a coupling portion 311 coupled to the bolt 131 between the distance brackets 121 and an insertion portion 312 configured to be inserted into or removed from the first slit 111 through the cutout 211 of the lower tube 120.

The first slit 111 is formed at a portion of the upper tube 110 which is inserted into the lower tube 120. Specifically, the first slit 111 of the upper tube 110 is formed at the position corresponding to the cutout 211 of the lower tube 120 positioned between the distance brackets 121. The cutout 211 of the lower tube 120 may be formed to communicate with the second slit 123. The first slit 111 is exposed to the outside of the lower tube 120 through the cutout 211, and the second stopper 150 is inserted into or removed from the first slit 111 through the cutout 211.

The coupling portion 311 of the second stopper 150 has a coupling hole where the bolt 131 is inserted. The insertion portion 312 extends from the coupling portion 311 to be inserted into or removed from the first slit 111 when the bolt 131 is moved and rotated in the axial direction of the bolt 131 according to the movement or manipulation of the lever 140.

According to an embodiment of the present disclosure, the steering device 100 of the vehicle may include a fixing member or fixer 511 coupled to the bolt 131 and supported by the coupling portion 311 and an elastic member 512 bringing or pressing the coupling portion 311 so that the coupling portion 311 can be in tight contact with the fixing member 511. The second stopper 150 may be axially fixed to the bolt 131 by the fixing member 511 and the elastic member 512 and be moved in the axial direction of the bolt 131 to be inserted into or removed from the first slit 111.

According to an embodiment of the present disclosure, the insertion portion 312 may have a damper 321. The insertion portion 312 has the damper 321, thereby absorbing the shock when the telescoping of the steering device 100 is stopped while the second stopper 150 is supported on two opposite ends of the slit 111 and enhancing the driver's manipulation while mitigating noise.

According to some embodiments of the present disclosure, a steering device of a vehicle can prevent damage to one or more components of the steering device and the loss of shock load absorption function during the telescoping of the steering device while implementing structural rigidity with increase in design freedom.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only.

That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering device of a vehicle, comprising:
a lower tube receiving an upper tube;
a locker configured to selectively lock or unlock an axial movement of the upper tube with respect to the lower tube according to movement of a lever; and
a stopper positioned to axially overlap the axial movement of the upper tube in interoperation with the locker which is in a state of unlocking the axial movement of the upper tube,
wherein:
the upper tube has a slit passing through an outer circumferential surface and an inner circumferential surface of the upper tube, and
the stopper is configured to, when the axial movement of the upper tube is locked by the locker, be removed from the slit of the upper tube.

2. The steering device of claim 1, wherein the stopper is configured to, when the axial movement of the upper tube is unlocked by the locker, be inserted into the slit of the upper tube.

3. The steering device of claim 2, wherein a damper is provided at a portion of the stopper which is insertable into the slit of the upper tube.

4. The steering device of claim 1, wherein:
the locker includes a bolt coupled with the lever,
the bolt is configured to be movable in an axial direction of the bolt or rotatable by the movement of the lever, and
the stopper is operably coupled to the bolt coupled with the lever.

5. The steering device of claim 4, wherein the stopper is configured to be, when the axial movement of the upper tube is unlocked by the locker, move in the axial direction of the bolt so that the stopper is inserted into the slit of the upper tube.

6. The steering device of claim 5, further comprising:
a fixer coupled to the bolt to support the stopper; and
an elastic member configured to press the stopper so that the stopper is in contact with the fixer.

7. The steering device of claim 4, wherein the stopper is configured to, when the axial movement of the upper tube is unlocked by the locker, move in a radial direction of the bolt such that the stopper is inserted into the slit of the upper tube.

8. The steering device of claim 7, wherein:
the bolt has an inclined recess where the stopper is seated, and
the steering device further comprises an elastic member configured to press the stopper in a direction of inserting the stopper into the slit of the upper tube.

9. The steering device of claim 4, wherein the stopper is configured to, when the axial movement of the upper tube is unlocked by the locker, rotate together with the bolt such that the stopper is inserted into the slit of the upper tube.

10. The steering device of claim 9, wherein the bolt and the stopper are coupled by a spline structure.

11. A steering device of a vehicle, comprising:
- an upper tube receiving a steering shaft and including a first axial slit passing through an outer circumferential surface and an inner circumferential surface of the upper tube;
- a lower tube receiving the upper tube and including a second axial slit passing through an outer circumferential surface and an inner circumferential surface of the lower tube, a pair of distance brackets facing each other, wherein the second axial slit is disposed between the pair of distance brackets, and a first stopper spaced apart from the distance brackets;
- a bolt passing through the distance brackets and coupled with a lever;
- a second stopper coupled to the bolt, the second stopper configured to be selectively inserted into the first axial slit of the upper tube or removed from the first axial slit of the upper tube according to movement of the lever; and
- a bending plate coupled to the upper tube and including a support positioned between the first stopper and the distance brackets of the lower tube.

12. The steering device of claim 11, wherein an axial distance between an end portion of the first slit of the upper tube and the second stopper in a state that the second stopper is inserted in the first slit of the upper tube is shorter than an axial distance between the first stopper of the lower tube and the support of the bending plate.

13. The steering device of claim 11, wherein an axial distance between another end portion of the first slit of the upper tube and the second stopper in a state that the second stopper is inserted in the first slit of the upper tube is shorter than an axial distance between the distance brackets of the lower tube and the support of the bending plate.

14. The steering device of claim 11, wherein the bending plate is coupled to the upper tube by a coupler configured to be shearable by a collapsing load.

15. The steering device of claim 11, further comprising a movable cam configured to be rotatable by the lever and a fixed cam engaged with the movable cam.

16. The steering device of claim 11, wherein:
- the lower tube has a cutout passing through an outer circumferential surface and an inner circumferential surface of the lower tube between the distance brackets,
- the first slit of the upper tube is formed at a position corresponding to the cutout of the lower tube, and
- the second stopper includes a coupling portion coupled to the bolt between the distance brackets and an insertion portion configured to be insertable into the first slit of the upper tube and removeable from the first slit through the cutout of the lower tube.

17. The steering device of claim 16, further comprising a fixer coupled to the bolt to be supported by the coupling portion of the second stopper and an elastic member configured to press the coupling portion of the second stopper such that the coupling portion of the second stopper is in contact with the fixer.

18. The steering device of claim 16, wherein a damper is provided at the insertion portion of the second stopper configured to be insertable into the first slit and removeable from the first slit.

* * * * *